(12) United States Patent
Gielarowski et al.

(10) Patent No.: US 9,544,209 B2
(45) Date of Patent: Jan. 10, 2017

(54) VERIFYING COMMUNICATION LANES BY INDIVIDUALLY DISCONNECTING TRANSMIT WIRES BY WIRE POLARITY

(71) Applicant: NetApp, Inc., Sunnyvale, CA (US)

(72) Inventors: Bryan J. Gielarowski, Pittsburgh, PA (US); Richard M. Strong, Pittsburgh, PA (US); Hor-Lam Cheuk, Cupertino, CA (US)

(73) Assignee: NetApp, Inc., Sunnyvale, CA (US)

( * ) Notice: Subject to any disclaimer, the term of this patent is extended or adjusted under 35 U.S.C. 154(b) by 171 days.

(21) Appl. No.: 14/665,767

(22) Filed: Mar. 23, 2015

(65) Prior Publication Data

US 2016/0285715 A1    Sep. 29, 2016

(51) Int. Cl.
*H04L 12/26* (2006.01)
*H04L 5/14* (2006.01)

(52) U.S. Cl.
CPC ............. *H04L 43/0811* (2013.01); *H04L 5/14* (2013.01); *H04L 43/50* (2013.01)

(58) Field of Classification Search
None
See application file for complete search history.

(56) References Cited

U.S. PATENT DOCUMENTS

| 8,295,163 | B1 * | 10/2012 | Schmalz | H04L 43/0811 324/533 |
| 2009/0265142 | A1 * | 10/2009 | Liu | H04L 12/24 702/190 |
| 2011/0075740 | A1 * | 3/2011 | Ferraiolo | H04L 25/0272 375/257 |
| 2012/0224614 | A1 * | 9/2012 | Iribe | H04B 17/17 375/219 |
| 2013/0283108 | A1 * | 10/2013 | Kono | H04L 43/50 714/712 |
| 2016/0179710 | A1 * | 6/2016 | Das Sharma | G06F 13/1673 710/310 |
| 2016/0196233 | A1 * | 7/2016 | Chen | H04L 27/32 710/106 |

OTHER PUBLICATIONS

Aguilar, et al., "Proposal of Implementation of the "Data Link Layer" of PCI-Express", 2004 1st International Conference on Electrical and Electronics Engineering, 2014, pp. 64-69.
ON Semiconductor, "MC74VHC4066: Quad Analog Switch/Multiplexer/Demultiplexer (Mux/Demux)", ON Semiconductor: Energy Efficient Innovations, Feb. 28, 2015, 1 page.

\* cited by examiner

*Primary Examiner* — Mohammad Adhami
(74) *Attorney, Agent, or Firm* — LeClairRyan, a Professional Corporation

(57) ABSTRACT

Individual wire defects in a data transfer/communication system that employs differential signaling can be detected during connectivity verification of a link prior to link training by individually disconnecting wires by wire polarity and testing the link. For example, the positive transmit wire of a lane may be verified by disconnecting the negative transmit wire of the lane and performing link connectivity verification. If the link passes connectivity verification, then the positive transmit wire of the lane is functioning normally. Connectivity of the negative transmit wire of the lane may then be verified by disconnecting the positive transmit wire of the lane and determining if the passes the connectivity verification.

20 Claims, 3 Drawing Sheets

VERIFYING COMMUNICATION LANES BY INDIVIDUALLY DISCONNECTING TRANSMIT WIRES BY WIRE POLARITY

BACKGROUND

This disclosure generally relates to the field of computer systems, and, more particularly, to the testing of electrical devices.

A Peripheral Component Interconnect Express ("PCIe") device initializes a link for data transfer/communication with another device using a PCIe link training process. During link training, devices exchange sequences to determine link parameters such as lane polarity, link width, and link speed. Link width corresponds to a number of lanes in the link. Each lane is a full duplex channel that includes a transmit pair of wires and a receive pair of wires. Each pair of wires is comprised of a positive wire and a negative wire for differential signaling. The link initialization process configures a PCIe device's hardware (e.g., control registers) that implements the PCIe physical layer. The configuration includes configuring a Link Training and Status State Machine ("LTSSM"), which guides the link initialization. An LTSSM consists of a number of states including the "detect," "polling," and "configuration" states. If an LTSSM successfully negotiates the states, the LTSSM is put into the "L0" state, which is the normal, fully active state during which a PCIe device may transmit and receive data packets. An LTSSM includes additional states such as the "recovery" state, which is entered from the L0 state when an error that renders a link inoperable occurs.

SUMMARY

Individual wire defects in a data transfer/communication system that employs differential signaling can be detected during a test for connectivity or connectivity verification prior to link training by individually disconnecting wires by wire polarity and testing the link. For example, the positive transmit wire of a lane may be verified by disconnecting the negative transmit wire of the lane and performing a connectivity test. If the link passes the connectivity test, then the positive transmit wire of the lane is functioning normally. Connectivity of the negative transmit wire of the lane may then be verified by disconnecting the positive transmit wire of the lane and determining if the link passes the connectivity test.

This summary is to be used as a brief summary for the disclosure, and not a comprehensive summary. The purpose of the brief summary is to provide a compact explanation that helps in understanding the disclosure. This brief summary does not capture the entire disclosure, and should not be used limit claim scope.

BRIEF DESCRIPTION OF THE DRAWINGS

The disclosures herein may be better understood by referencing the accompanying drawings.

DETAILED DESCRIPTION

The description that follows includes example systems, methods, techniques, and machine instructions/program code that embody techniques of the disclosure. However, it is understood that the described aspects may be practiced without these specific details. For instance, although examples refer to PCIe, the disclosure can also be employed for another communication/data transfer protocol that uses differential signaling. As another instance, the examples refer to receive detection as an example of connectivity verification. But other types of connectivity verification that send pulses over both wires of a differential signaling channel fall within the scope of the claims. In other instances, well-known instruction instances, protocols, structures and techniques have not been shown in detail in order not to obfuscate the description.

Introduction

PCIe link training begins with the LTSSM in the "detect" state where a PCIe device detects the presence or absence of another device connected at the end of a link. During the detect state, differential signaling is not used. Instead, the transmitter (TX) outputs independent, common-mode pulses over both the positive and negative wires of all lanes in the link being initialized. If a device is detected at the end of either the positive or the negative side of a differential signaling lane, the TX determines that a device is present, and link initialization continues. Because only one of a transmit pair is needed to detect the presence of another device, errors in the other wire, such as a missing or damaged DC-blocking capacitor, may not be detected during link initialization. In fact, a link between a PCIe device and another device may fully train and initialize with a defective wire. In such a situation, the two devices are likely to suffer reduced performance, undefined behavior, lane drop-outs, and crashes or hangs.

Overview

Individual wire defects in a data transfer/communication system that employs differential signaling can be detected during connectivity verification of a link prior to link training by individually disconnecting wires by wire polarity and testing the link. For example, the positive transmit wire of a lane may be verified by disconnecting the negative transmit wire of the lane and performing link connectivity verification. If the link passes connectivity verification, then the positive transmit wire of the lane is functioning normally. Connectivity of the negative transmit wire of the lane may then be verified by disconnecting the positive transmit wire of the lane and determining if the link passes the connectivity verification.

Example Illustrations

Figure 1:
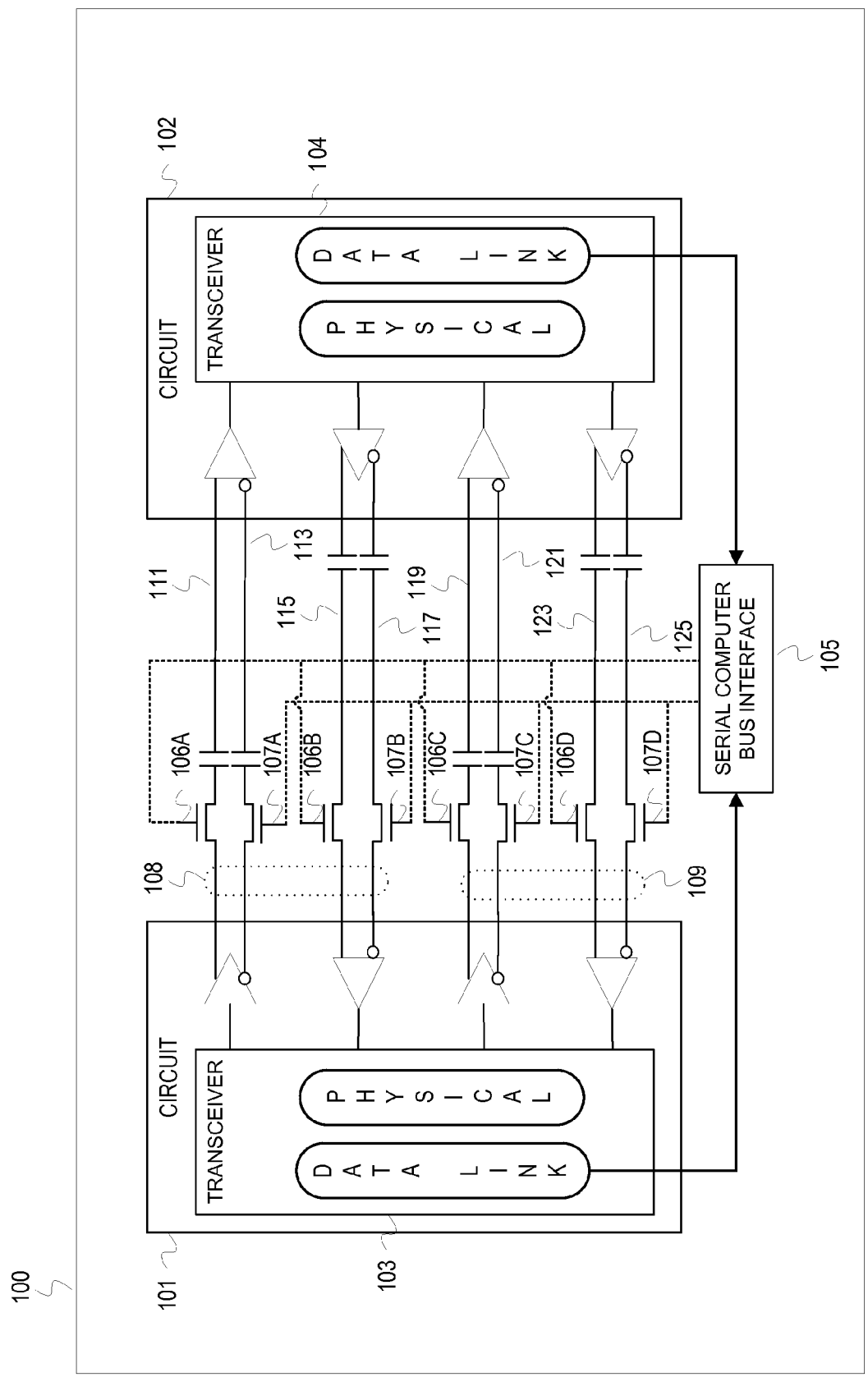
FIG. 1 is a conceptual diagram illustrating in-line switches that are externally controlled to individually disconnect transmit wires by polarity during link training.

FIG. 1 is a conceptual diagram illustrating in-line switches that are externally controlled to individually disconnect transmit wires by polarity during link training. FIG. 1 depicts a circuit board 100 that includes a circuit 101, a circuit 102, and a serial computer bus interface 105 ("interface 105"). The circuit 101 includes a transceiver 103 configured to perform link training. The circuit 102 includes a transceiver 104 also configured to perform link training. The transceiver 103 and 104 each include hardware, and possibly firmware, to implement the data link layer and the physical layer of a communication protocol that employs differential signaling. For instance, the data link layer maintains an LTSSM. The circuit 101 and the circuit 102 are connected by full duplex differential signaling lanes (hereinafter lanes) 108 and 109. From the perspective of the circuit 101, the lane 108 includes in-line switch 106A on the positive transmit wire and in-line switch 107A on the negative transmit wire. The lane 108 includes in-line switch 106B and 107B on the positive and negative receive wires, respectively. Likewise, the lane 109, again from the perspective of the circuit 101, includes in-line switches 106C and 107C on the positive and negative transmit wires, respectively; and includes in-line switches 106D and 107D on the positive and negative receive wires, respectively. The interface 105 is connected to control the in-line switches 106A-106D and 107A-107D (hereinafter referred to as "the in-line switches"). And the data link layers of the circuits 101, 102 are coupled to control the interface 105.

The circuit 101 and the circuit 102 may be connected to the board 100 through a direct soldered connection, through a socket such as a land grid array ("LGA") socket, by surface mounting, through a connector, etc. The circuit 101 and the circuit 102 may be any kind of integrated circuit that transfers data over links that employ differential signaling. For example, one of the circuits may be a processor or may be an integrated circuit on a PCIe card that connects to the board 100 through a PCIe interface connector. The board 100 may also include connected components other than those depicted.

The data link layers of the transceivers 103 and 104 drive link initialization for their respective circuit. The data link layer causes the physical layer to perform receive (RX) detection. As a result, the physical layer of the transceiver 103 causes common mode pulses to be output over the transmit pair of the lanes 108, 109 to the circuit 102. Similarly, data link layer of the transceiver 104 causes the physical layer to perform RX detection with transmit wires of the lanes 108, 109 from the perspective of the circuit 102, which are the receive pairs from the perspective of the circuit 101. Before the pulses are sent, though, the data link layers of the transceivers 103, 104 select either the positive or negative wires for deactivation. Afterwards, the data link layers of the transceivers 103, 104, select the other wires for deactivation.

The data link layers can select either wire polarity for initial deactivation before RX detection. Assuming the data link layers select the negative wires for deactivation first, the data link layer of the transceiver 103 causes the in-line switches 107A and 107C to functionally disconnect the negative wires 113, 121. The data link layer of the transceiver 103 can then initiate RX detection with the physical layer. If RX detection fails on either of the lanes, then the data link layer can indicate the failure as corresponding to a positive wire and the corresponding lane number. For instance, the data link layer of the transceiver 103 can detect success for lane 109 and failure for lane 108. Assuming lane 108 is identified as lane 0, the data link layer of the transceiver 103 can record an indication of lane 0 and a flag or bit previously defined to represent a positive wire. If RX detection is successful, then the data link layer proceeds to cause the in-line switches 106A and 106C to functionally disconnect the positive wires 111, 119. The data link layer of the transceiver 103 again initiates RX detection with the physical layer. If RX detection fails on either of the lanes, then the data link layer can indicate the failure as corresponding to the negative wire and the corresponding lane number. If RX detection is successful, then the data link layer proceeds with link training after successful RX detection for all positive and negative wires. The data link layer of the circuit 102 goes through the same process of disconnecting and RX detection but on the wires 115, 117, 123, 125.

The in-line switches may be P-type transistors, N-type transistors, or any other circuitry capable of breaking a connection. If the in-line switches are P-type transistors, then the in-line switches will default to a deactivated state when the input to each switch is a logical value of 0. P-type in-line switches may be activated by applying a logical value of 1 using the interface 105. Conversely, when the in-line switches are N-type transistors, the switches are deactivated when a logical value of 1 is applied and are activated when a logical value of 0 is applied. The in-line switches may be connected to registers, not depicted, that are designed to store the values applied using the interface 105.

The interface 105 may be any type of interface that allows communication with components on the board 100 and is capable of changing the state of the in-line switches. For example, the I$^2$C serial computer bus interface may be used. The interface 105 may be a separate component on the board 100, may be a component of the circuit 10, or of the circuit 102.

The in-line switches are depicted in FIG. 1 as being included in the differential signaling lanes 108 and 109. The in-line switches may also be integrated into the circuit 101 and/or circuit 102 and similarly controlled by the interface 105. In addition, control of the switching functionality can be implemented with components in the circuits instead of with an external interface, as depicted later in FIG. 3.

Figure 2:
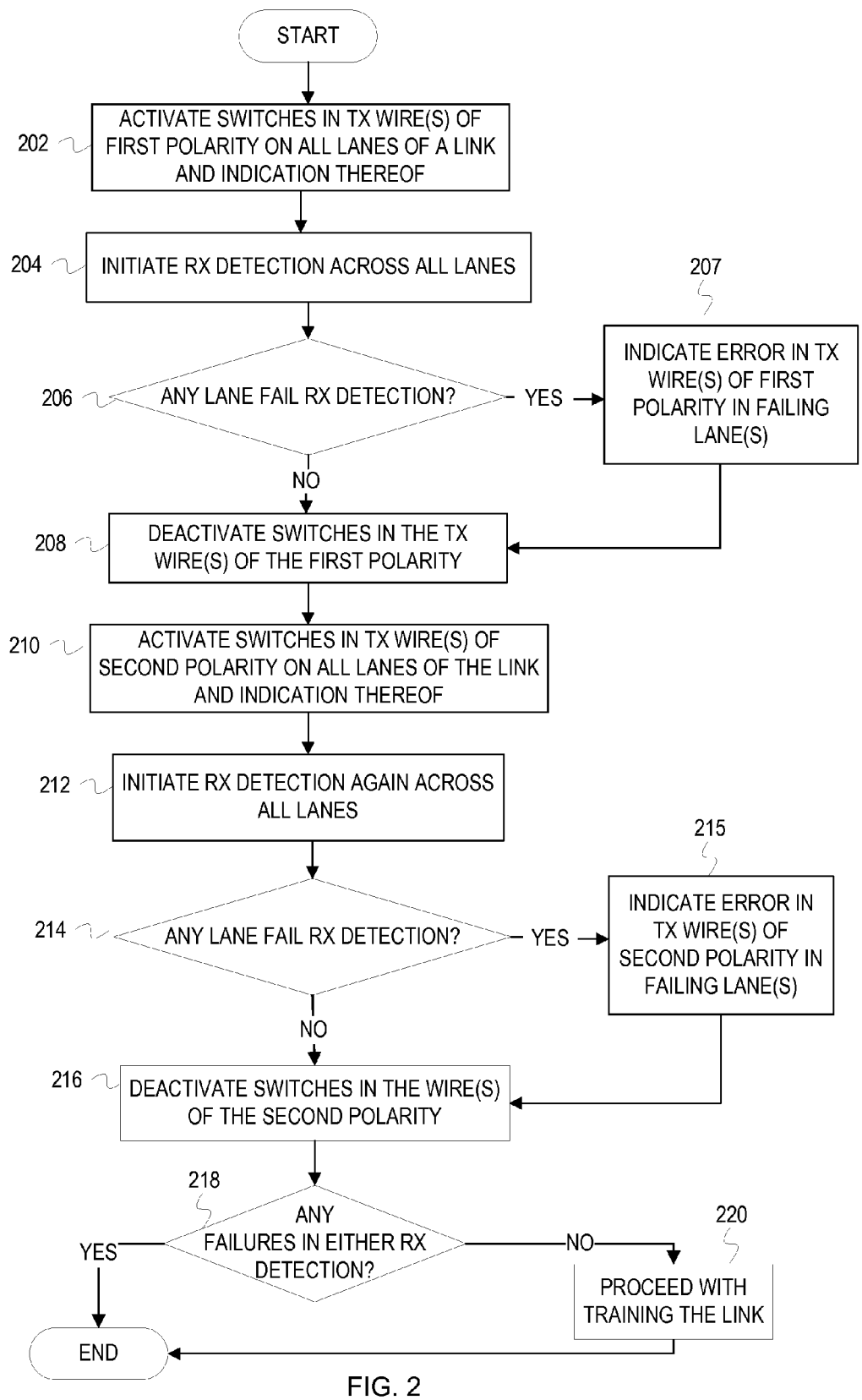
FIG. 2 depicts a flow diagram illustrating example operations for verifying link functionality with receive detection by wire polarity.

FIG. 2 depicts a flow diagram illustrating example operations for verifying link functionality with receive detection by wire polarity. The logic and/or program code (e.g., firmware) to implement operations for detecting individual wire failure in a differential signaling channel is likely implemented in a data link layer of a communication protocol. However, some aspects can be at a higher layer, such as a transaction layer. For consistency with the other examples, the operations of FIG. 2 will be described with reference to a data link layer.

At block 202, a data link layer activates switches in transmit wire(s) of a first polarity of all lanes of a link. The data link layer also sets a bit or flag that indicates the first polarity transmit wire(s) is being functionally disconnected, or that the second polarity transmit wire(s) is being tested. Although a link will likely have multiple lanes, the description uses "wire(s)" and "lane(s)" to cover a case of a single lane link. The data link layer can assert a pin or set a control value in a register that activates the switches, which functionally disconnect the corresponding wires. Although a single control signal or value can be set to activate all switches, the disclosure is not so limited. The data link layer may set a control signal or value that control fewer than all switches across all lanes of the link. For example, a link may have 32 lanes, which would include 64 transmit wires. Layout of the supporting circuit board or of the testing circuit may cause a designer to run control lines for every 4 transmit wires. Thus, the data link layer would set the control signal or control value 8 times for each wire polarity. As another example, the data link layer can perform receive detection at a granularity less than all lanes of the link.

At block 204, the data link layer initiates receive detection. As described above, this causes the physical layer to drive a common mode pulse over the transmit wires of the lanes instead of using differential signaling. However, the data link layer has already activated the switches to functionally disconnect the transmit wires of the first polarity. Thus, the pulses for receive detection will only travel over the transmit wires of the second polarity. As long as the transmit wires of the second polarity are functioning properly, receive detection will be successful despite the functional disconnecting of the first polarity transmit wires.

At block 206, the data link layer determines whether any of the lanes of the link failed receive detection. If any lane fails receive detection, the physical layer can identify the failing lane(s) to the data link layer. For example, the physical layer can set a bit indicating failure in each register bound to a failing lane, assuming an architecture with a register defined for each lane. As another example, the physical layer can record identities of failing lanes into an array accessed by the data link layer. The physical layer will notify the data link layer when a determination of failure or success has been made for all lanes to cause the data link layer to read the array. If any lane fails receive detection, the control flows to block 207. If no lane fails receive detection, then control flows to block 208.

At block 207, the data link layer indicates an error in a second polarity transmit wire(s) of the failing lane(s). The data link layer may indicate the error with different techniques. For example, the data link layer can generate a notification or record the failure information into a log. As another example, the data link layer can format the failure information for consumption by a higher layer, such as a transaction layer. Control flows from block 207 to block 208.

At block 208, the data link layer deactivates the switches activated in the first polarity transmit wire(s).

At block 210, the data link layer activates switches in a transmit wire(s) of a second polarity of all lanes of a link. As mentioned above, the data link layer can supply a control signal or set a control value in a register that activates the switches, which functionally disconnect the second polarity transmit wires. The data link layer also sets a bit or flag that indicates the second polarity transmit wire(s) is being functionally disconnected, or that the first polarity transmit wire(s) is being tested.

At block 212, the data link layer initiates receive detection again. Since the data link layer has now activated the switches to functionally disconnect the second polarity transmit wires, the pulses for receive detection will only travel over the transmit wires of the first polarity. As long as the transmit wires of the first polarity are functioning properly, receive detection will be successful despite the functional disconnecting of the second polarity transmit wires.

At block 214, the data link layer determines whether any of the lanes of the link failed the second receive detection. If any lane fails the second receive detection, then control flows to block 215. If no lane fails the second receive detection, then control flows to block 216.

At block 215, the data link layer indicates an error in a first polarity transmit wire(s) of the failing lane(s). Control flows from block 215 to block 216.

At block 216, the data link layer deactivates the switches activated in the second polarity transmit wire(s).

At block 218, the data link layer determines whether there has been a failure in any lane in either of the receive detections. If there has been a failure in either of the receive detections, then the process ends. At least one wire has a defect and the data link layer will stop link training until the defect is corrected or the termination of training is overridden. If there has been no failure in either of the receive detections, then control flows to block 220.

At block 220, the data link layer proceeds with training the link.

As mentioned above, selecting wires by polarity can be done with different techniques. The wires can be selected with externally controlled in-line switches. For example, testing software outside of the data link layer of the training circuit can control an interface that controls the in-line switches. The wires can be selected with internally controlled in-line switches. For example, the data link layer of the training circuit can control in-line switches. In addition, the transceiver can be configured to selectively control the pulses supplied over the transmit wires while maintaining compliance with an interconnect protocol, such as PCIe.

Figure 3:
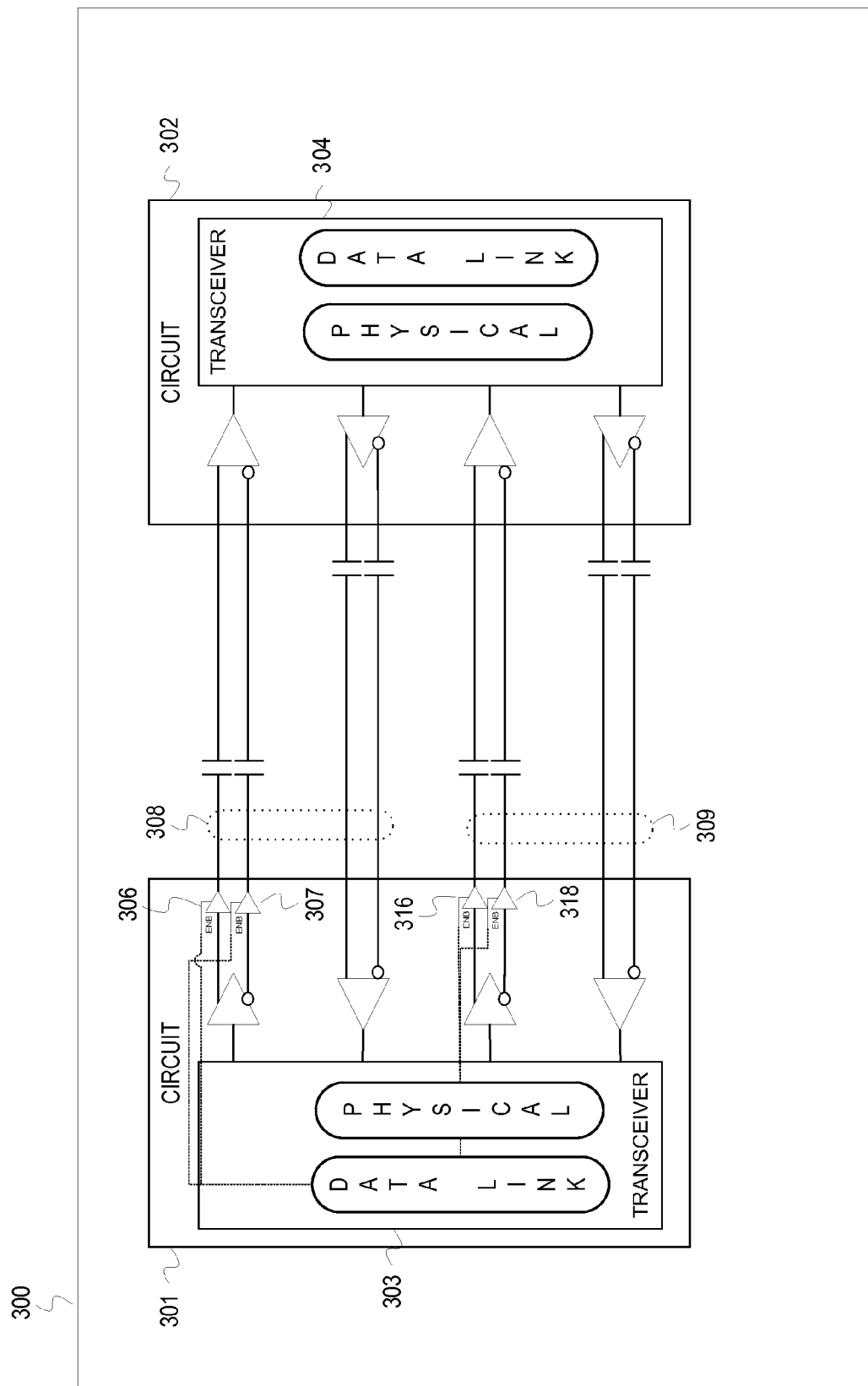
FIG. 3 is a conceptual diagram illustrating in-line switches incorporated into a circuit and internally controlled to individually disconnect transmit wires by polarity during link training.

FIG. 3 is a conceptual diagram illustrating in-line switches incorporated into a training circuit and internally controlled to individually disconnect transmit wires by polarity during link training. FIG. 3 depicts a printed circuit board 300 including a circuit 301 and a circuit 302. The circuit 301 includes a transceiver 303 configured to perform link training. The circuit 302 includes a transceiver 304 also configured to perform link training. The transceivers 303 and 304 each include hardware, and possibly firmware, to implement the data link layer and the physical layer of a communication protocol that employs differential signaling. For instance, the data link layer and physical layer implementation conform to the PCIe standard. The circuit 301 and the circuit 302 are connected by full duplex channels that use differential signaling. The full duplex channels include lanes 308 and 309.

For simplicity, FIG. 3 only depicts in-line switches on the transmit wires of the circuit 301. The transmit wires from the circuit 302 can also have in-line switches incorporated into the circuit 302. From the perspective of the circuit 301, the lane 308 includes a tri-state buffer 306 controlled to operate as an in-line switch on the positive transmit wire and a tri-state buffer 307 to operate as an in-line switch on the negative transmit wire of the lane 308. The lane 109, again from the perspective of the circuit 301, includes tri-state buffers 316, 318 that operate as in-line switches on the positive and negative transmit wires, respectively. The data link layer of the transceiver 303 controls the tri-state buffers 306, 307, 316, and 318 as shown with dotted control lines. As shown in FIG. 3, the tri-state buffers 306, 307, 316, and 318 are incorporated into the circuit 301.

The circuit 301 and the circuit 302 may be connected to the board 300 through a direct soldered connection, through a socket such as a land grid array ("LGA") socket, by surface mounting, through a connector, etc. The circuit 301 and the circuit 302 may be any kind of integrated circuit that transfers data over links that employ differential signaling. For example, one of the circuits may be a processor or may be an integrated circuit on a PCIe card that connects to the board 300 through a PCIe interface connector. The board 300 may also include connected components other than those depicted.

The data link layer of the transceiver 303 will operate similar to the data link layers in FIG. 1. The data link layer of the transceiver 303 will activate the tri-state buffers to functionally disconnect the transmit wires by polarity during receive detection.

The example illustrations are provided to aid in understanding the disclosure and are not to be used to limit scope of the claims. For instance, the flowchart depicts example operations that can vary within the scope of the claims. Additional operations may be performed; fewer operations may be performed; operations may be performed in parallel; and operations may be performed in a different order. For example, the operations depicted presumed that failure of individual lanes could be identified during receive detection. In some cases, an individual failed lane cannot be identified from a receive detection performed on all lanes. In that case, the receive detection can be performed on each lane instead of all lanes. Alternatively, receive detection can be performed on individual lanes if a failure is detected after receive detection on multiple (or all) lanes. With reference to FIG. 2, a data link layer may iteratively perform receive detection over each lane of a link after block 206. When a failure occurs during the iterative receive detection, the data link layer can then indicate the error and the corresponding lane. Similarly, the data link layer may iteratively perform receive detection over each lane of the link after block 214 when a failure is discovered from the receive detection over all lanes.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

Aspects of this disclosure are described with reference to flowchart illustrations and/or block diagrams. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

While aspects are described with reference to various exploitations, it will be understood that these aspects are illustrative and that the scope of the disclosure is not limited to them. In general, selectively disabling transmit wires by polarity during receive detection on a full duplex channel that uses differential signaling for data transfers to verify transmit wire functionality as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the disclosure.

Use of the phrase "at least one of . . . or" should not be construed to be exclusive. For instance, the phrase "X comprises at least one of A, B, or C" does not mean that X comprises only one of {A, B, C}; it does not mean that X comprises only one instance of each of {A, B, C}, even if any one of {A, B, C} is a category or sub-category; and it does not mean that an additional element cannot be added to the non-exclusive set (i.e., X can comprise {A, B, Z}).

This description refers to wires, which can be interpreted in different ways. For this disclosure, the term "wire"

includes any physical point-to-point medium that carries a signal. Examples of a wire include a metallic wire and a trace.

This description also referred to an example implementation of a circuit that performed link training. In these examples, a transceiver is depicted. The claims are not limited to a single chip transceiver. This disclosure also applies to a circuit with separate transmit and receive circuitry as well as a transceiver. Even though a single block is depicted as a transceiver, the transceiver could be considered a transmitter and receiver in close proximity Further, this description refers to layers (i.e., data link layer and physical layer) implemented in a transceiver. Regardless of whether the layers are implemented in separate transmit and receive circuitry or a transceiver, layers are logical constructs that encompass the various components to carry out a particular functionality and may also include machine instructions. Manufacturers and designers will create circuits with a variety of differences that comply with a communication or interconnect standard, such as PCIe, despite the differences. This is because the standards provide guidelines and not implementation details. And programmable logic (e.g., a field programmable gate array) can be used to for a transceiver, receiver, or transmitter. Thus, a variety of circuits can be designed/manufactured to conform to the specification for the data link layer and physical layer and conform to this disclosure. In other words, this disclosure does not delve into the details of layer components since they can vary (e.g., 8b/10b encoder, parallel to serial data converter, scrambler, multiplexer and buffer placement, memory controller, etc.), and whether those components are in transceiver circuitry, receiver circuitry, or transmitter circuitry because those details are not necessary for understanding this disclosure.

What is claimed is:

1. A method of verifying functionality of a link connecting integrated circuits, the method comprising:
    activating first switches in each full duplex channel of the link,
        wherein each full duplex channel includes a pair of transmit wires and a pair of receive wires, each pair of wires having a first wire of a first polarity and a second wire of a second polarity for differential signaling,
        wherein the first switches are in the first wires of the transmit wires;
        wherein activating the first switches functionally disconnects the first wires;
    initiating a first receive detection on the link;
    associating a failure in the first receive detection with the second polarity;
    deactivating the first switches;
    activating second switches in each full duplex channel of the link,
        wherein the second switches are in the second wires of the transmit wires;
        wherein activating the second switches functionally disconnects the second wires;
    initiating a second receive detection on the link; and
    associating a failure in the second receive detection with the first polarity.

2. The method of claim 1, wherein activating the first switches comprises at least one of supplying a control signal to the first switches or setting a control value.

3. The method of claim 1, wherein initiating the first receive detection on the link comprises causing a driver to supply pulses over the pair of transmit wires in each full duplex channel.

4. The method of claim 1, wherein associating the failure in the first receive detection with the second polarity comprises indicating a defect with the second wire of the second polarity in the full duplex channel that caused the failure.

5. The method of claim 1, wherein associating the failure in the second receive detection with the first polarity comprises indicating a defect with the first wire of the first polarity in the full duplex channel that caused the failure.

6. The method of claim 1 further comprising:
    determining that the first receive detection had a failure; and
    iteratively conducting receive detection on each full duplex channel of the link.

7. The method of claim 1, wherein initiating the first receive detection on the link comprises conducting receive detection on all channels of the link.

8. The method of claim 1 further comprising terminating link training if either of the first receive detection and the second receive detection had a failure.

9. The method of claim 1 further comprising proceeding with link training if neither of the first receive detection and the second receive detection had a failure.

10. A system comprising:
    an integrated circuit having transmit circuitry and receive circuitry;
        the transmit circuitry coupled to a plurality of full duplex channels, each of the plurality of full duplex channels including a first transmit wire of a first polarity and a second transmit wire of a second polarity, each of the transmit wires having an in-line switch to functionally disconnect the corresponding wire; and
    data link layer components that control activation of the in-line switches to functionally disconnect all of the transmit wires of a first polarity for a first receive detection, to deactivate the switches after the first receive detection, to functionally disconnect all of the transmit wires of a second polarity for a second receive detection.

11. The system of claim 10, wherein the integrated circuit comprises the in-line switches.

12. The system of claim 10 further comprising a printed circuit board, wherein the printed circuit board comprises the in-line switches.

13. The system of claim 10 further comprising a serial computer bus interface coupled to control the in-line switches, wherein at least one component of the data link layer components is coupled to supply a control signal or control data to the serial computer bus interface.

14. The system of claim 10 further comprising a second integrated circuit coupled to the integrated circuit via the plurality of full duplex channels, wherein each of the plurality of duplex channels includes a first receive wire of the first polarity and a second receive wire of the second polarity, each of the receive wires having an in-line switch to functionally disconnect the corresponding wire, wherein the second integrated circuit is coupled to control the in-line switches of the receive wires.

15. The system of claim 10, wherein a transceiver comprises the transmit circuitry and the receive circuitry.

16. The system of claim 10, wherein a transmitter comprises the transmit circuitry and a receiver comprises the receive circuitry.

17. One or more non-transitory machine-readable media having program code stored therein, the program code to:
  activate first switches in each full duplex channel of a link coupling integrated circuits,
    wherein each full duplex channel includes a pair of transmit wires and a pair of receive wires, each pair of wires having a first wire of a first polarity and a second wire of a second polarity for differential signaling,
    wherein the first switches are in the first wires of the transmit wires;
    wherein activation of the first switches functionally disconnects the first wires;
  initiate a first receive detection on the link;
  associate a failure in the first receive detection with the second polarity;
  deactivate the first switches;
  activate second switches in each full duplex channel of the link,
    wherein the second switches are in the second wires of the transmit wires;
    wherein activation of the second switches functionally disconnects the second wires;
  initiate a second receive detection on the link; and
  associate a failure in the second receive detection with the first polarity.

18. The one or more non-transitory machine-readable media of claim 17, wherein the program code to associate the failure in the first receive detection with the second polarity comprises the program code to indicate a defect with the second wire of the second polarity in the full duplex channel that caused the failure.

19. The one or more non-transitory machine-readable media of claim 17, wherein program code to associate the failure in the second receive detection with the first polarity comprises program code to indicate a defect with the first wire of the first polarity in the full duplex channel that caused the failure.

20. The one or more non-transitory machine-readable media of claim 17 further comprising program code to:
  determine that the first receive detection had a failure; and
  iteratively conduct receive detection on each full duplex channel of the link.

\* \* \* \* \*